United States Patent
Urbach

(10) Patent No.: US 10,230,565 B2
(45) Date of Patent: *Mar. 12, 2019

(54) ALLOCATION OF GPU RESOURCES ACROSS MULTIPLE CLIENTS

(71) Applicant: OTOY, INC., Los Angeles, CA (US)

(72) Inventor: Julian Michael Urbach, Sherman Oaks, CA (US)

(73) Assignee: OTOY, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,688

(22) Filed: May 15, 2017

(65) Prior Publication Data

US 2017/0250850 A1 Aug. 31, 2017

Related U.S. Application Data

(63) Continuation of application No. 14/327,053, filed on Jul. 9, 2014, now Pat. No. 9,660,928, which is a continuation of application No. 12/797,788, filed on Jun. 10, 2010, now Pat. No. 8,803,892.

(51) Int. Cl.
| | |
|---|---|
| *G06F 9/50* | (2006.01) |
| *G06F 17/14* | (2006.01) |
| *H04L 12/70* | (2013.01) |
| *H04L 29/06* | (2006.01) |
| *H04L 29/08* | (2006.01) |

(Continued)

(52) U.S. Cl.
CPC ...... *H04L 29/08108* (2013.01); *G06F 9/5016* (2013.01); *G06F 9/5027* (2013.01); *G06F 17/142* (2013.01); *G06F 17/147* (2013.01); *H04L 29/06047* (2013.01); *H04L 29/0809* (2013.01); *H04L 29/08171* (2013.01); *H04L 47/70* (2013.01); *H04L 47/125* (2013.01); *H04L 2012/5631* (2013.01)

(58) Field of Classification Search
CPC ..... G06T 15/005; G06T 1/20; G06T 2210/52; G06T 1/00
See application file for complete search history.

(56) References Cited

U.S. PATENT DOCUMENTS

| | | |
|---|---|---|
| 2007/0097130 A1 | 5/2007 | Margulis |
| 2009/0201303 A1 | 8/2009 | Westerhoff et al. |
| 2010/0124992 A1 | 5/2010 | Park et al. |

(Continued)

OTHER PUBLICATIONS

Supplemental European Search Report to corresponding European Application No. 11793211 dated May 12, 2017 (9 pages).

*Primary Examiner* — Haixia Du
(74) *Attorney, Agent, or Firm* — James J. DeCarlo; Greenberg Traurig, LLP

(57) ABSTRACT

Methods, apparatuses and systems directed to hosting, on a computer system, a plurality of application instances, each application instance corresponding to a remote client application; maintaining a network connection to each of the remote client applications for which an application instance is hosted; allocating resources of a graphics processing unit of the computer system between at least two of the remote client applications; concurrently rendering, utilizing the resources of the graphics processing unit of the computer system, the graphical output of the application instances corresponding to the at least two of the remote client applications; and transmitting the rendered graphical output to the at least two of the remote client applications over the respective network connections.

21 Claims, 5 Drawing Sheets

(51) Int. Cl.
*H04L 12/803* (2013.01)
*H04L 12/911* (2013.01)

(56) References Cited

U.S. PATENT DOCUMENTS

2010/0141666 A1 6/2010 Christopher et al.
2010/0306813 A1 12/2010 Perry et al.

ALLOCATION OF GPU RESOURCES ACROSS MULTIPLE CLIENTS

CROSS REFERENCES TO RELATED APPLICATIONS

This application is a continuation of and claims priority to U.S. Non-Provisional application Ser. No. 14/327,053, filed on Jul. 9, 2014, entitled "ALLOCATION OF GPU RESOURCES ACROSS MULTIPLE CLIENTS," which is a continuation of and claims priority to U.S. Non-Provisional application Ser. No. 12/797,788, filed on Jun. 10, 2010, now U.S. Pat. No. 8,803,892, entitled "ALLOCATION OF GPU RESOURCES ACROSS MULTIPLE CLIENTS," the entirety of which are incorporated herein by reference.

TECHNICAL FIELD

The present disclosure generally relates to server-side rendering of applications and more specifically relates to a server concurrently rendering multiple applications for multiple clients based on multiple sets of rendering parameters.

BACKGROUND

A client-server architecture, in general, is a distributed computing architecture that partitions tasks or work loads between servers, which may be considered as "service providers", and clients, which may be considered as "service requesters" or "service consumers". Often, the servers and the clients are connected via a computer network and various types of data may be transmitted between individual servers and individual clients bi-directionally over the computer network.

The servers usually have more resources and greater performance capabilities than the clients. A server may share its resources with one or more clients, such as performing certain tasks for the clients (i.e., providing services to the clients). Because a server typically has more resources than a client, the server may complete a task, especially a resource-demanding task, much faster than the client is able to.

Data exchanged between a server and a client may be represented using any suitable data format and transmitted using any suitable communications protocol. For example, when an application is executed on a server for a client, the output of the application may be represented using a structured document, such as a HyperText Markup Language (HTML) document or an Extensible Markup Language (XML) document. The server may transmit the HTML or XML document, which includes the data that represent the output of the application, to the client over a HperText Transfer Protocol (HTTP) connection between the server and the client. The client, upon receiving the HTML or XML document, may consume the document and render the output of the application locally using the HTML or XML document, such as in a web browser executed on the client.

SUMMARY

The present disclosure generally relates to server-side rendering of applications and more specifically relates to a server concurrently rendering multiple applications for multiple clients based on multiple sets of rendering parameters. In one embodiment, a computer system hosts a plurality of application instances, each application instance corresponding to a remote client application. The computer system maintains a network connection to each of the remote client applications for which an application instance is hosted. The computer system allocates resources of a graphics processing unit of the computer system between at least two of the remote client applications. The computer system concurrently renders, utilizing the resources of the graphics processing unit of the computer system, the graphical output of the application instances corresponding to the at least two of the remote client applications. And, the computer system transmits the rendered graphical output to the at least two of the remote client applications over the respective network connections.

In one embodiment, a first computer system accesses a plurality sets of rendering parameters, wherein: the first computer system is connected to a plurality of second computer systems; each one of the plurality sets of rendering parameters corresponds to a particular one of the plurality of second computer systems; the first computer system comprises a rendering target for storing images; and the rendering target is shared among the plurality of second computer systems. The first computer system concurrently renders a plurality of images for the plurality of second computer systems based on the plurality sets of rendering parameters, wherein each one of the plurality of images is rendered for a particular one of the plurality of second computer systems, based on a particular one of the plurality sets of rendering parameters corresponding to the particular one of the plurality of second computer systems, and stored in the rendering target. And the first computer system transmits each one of the plurality of images to the particular one of the plurality of second computer systems for which the image has been rendered.

These and other features, aspects, and advantages of the disclosure are described in more detail below in the detailed description and in conjunction with the following figures.

DETAILED DESCRIPTION

Figure 1:
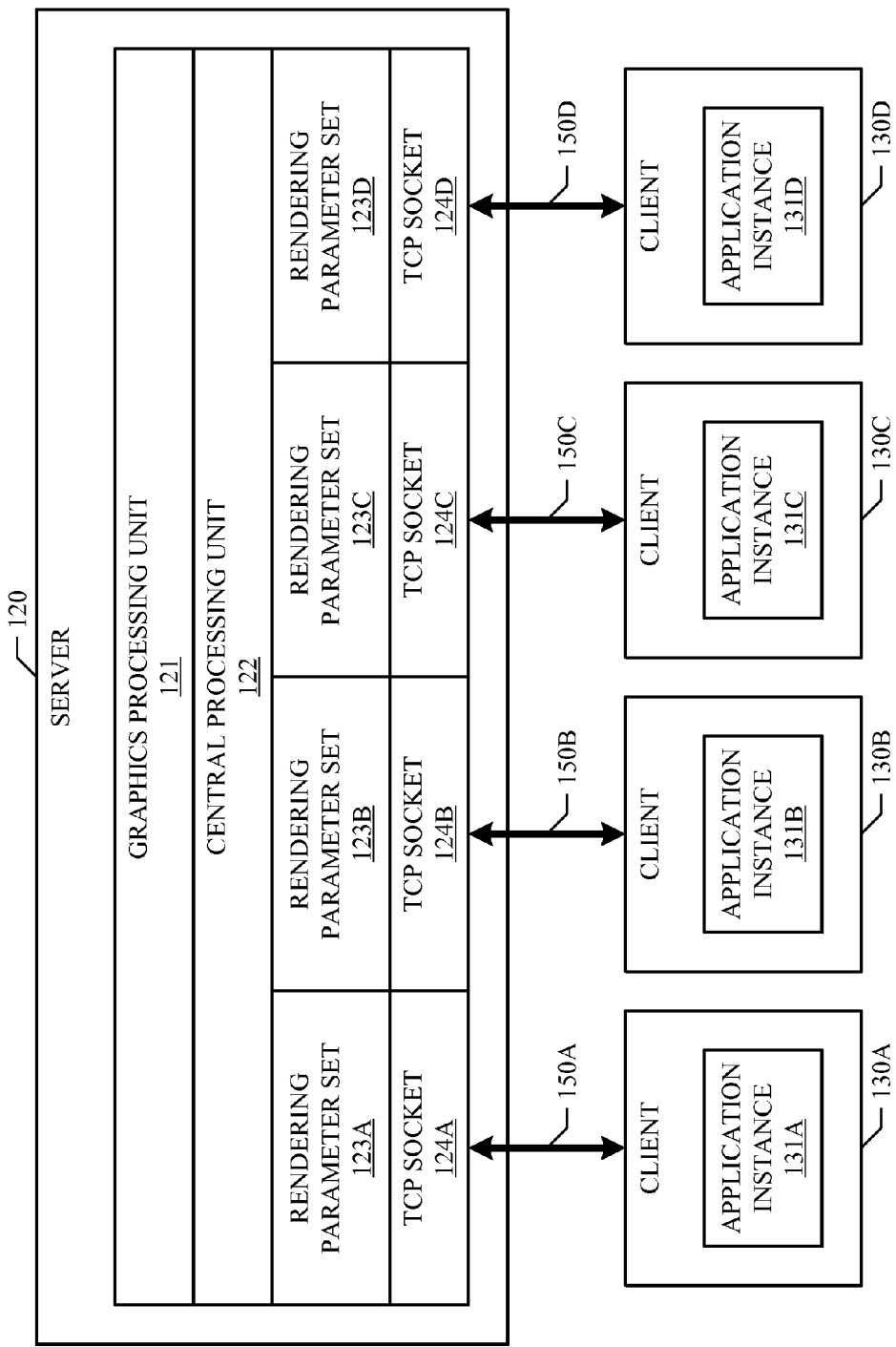
FIG. 1 illustrates an example client-server system for allocating a server's resources across multiple clients.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A client-server architecture enables a server to share its resources with one or more clients. Such an architecture has various advantages. For example, because the servers typically have more resources (e.g., processor or memory) and greater performance capabilities than the clients, a server may complete a task faster than a client is able to. Such performance difference is especially noticeable when the task is resource demanding or when the client has a limited amount of resources. At the same time, while the server is performing the task on behalf of or for the client, the resources of the client may be freed up to perform other tasks, such as those tasks that need to be performed locally on the client (e.g., interacting with the user of the client).

One type of task that may be suitable to be performed on the servers may be the rendering of an application hosted by a server as video output for transmission to a client. In the context of computer graphics, rendering may be considered as the process of generating an image from a model, usually by means of computer programs. The model is usually a description of three-dimensional (3D) objects and may be represented in a strictly defined language or data structure. The model may contain geometry, viewpoint, texture, lighting, shading, motion, and other suitable types of information. The image into which the model is rendered may be a digital image or a raster graphics image, which may be formed by a collection of pixels. The present disclosure expands the concept of rendering to generating an image that represents any output of any application. The rendering may be performed based on any data, including two-dimensional (2D) data as well as 3D data. In addition to generating images based on 3D models, particular embodiments may render images that represent the output of applications such as, for example and without limitation, web browsing applications, word processing applications, spread sheet applications, multimedia applications, scientific and medical applications, and game applications.

Rendering may be a type of task that is suitable to be performed by a server because the rendering process is often resource demanding, as it may be very computational intensive, especially when the rendered images are high resolution and high quality. In the past, it could have taken an older computer system hours or days to render a three-dimensional model into a single 2D image. With the development and advancement of computer hardware, especially computer hardware specifically designed for computer graphics applications (e.g., gaming, multimedia, entertainment, or mapping), present computer systems may be able to render each image within seconds or milliseconds. In fact, often it does not take all the available resources of a server to render a model into a single image.

To better utilize the available resources of a server, in particular embodiments, the server may concurrently perform multiple renderings (e.g., concurrently render multiple 3D models into multiple 2D images) for multiple clients, with each of the renderings performed for a different client. In particular embodiments, the available resources of the server may be allocated to and shared by the multiple clients. Thus, each of the clients is allocated a portion of the available resources of the server. More specifically, in particular embodiments, a Graphics Processing Unit (GPU) of the server is shared among the clients. Each of the renderings performed for a particular client may use the portion of the resources specifically allocated for that client. In particular embodiments, each of the rendered images, which are the resulting output of the rendering processes, may be transmitted to the corresponding client for which the rendered image is obtained.

FIG. 1 illustrates an example system where a single server 120 performs multiple renderings concurrently for multiple clients 130. Note that only four clients 130A, 130B, 130C, 130D are illustrated in FIG. 1 in order to simplify the discussion. In practice, a server may concurrently perform renderings for any number of clients and there is no theoretical limitation on how many clients a server may support at any time. Similarly, only one GPU 121 and one CPU 122 are illustrated in FIG. 1 in order to simplify the discussion. In practice, a server may have any number of GPUs and CPUs.

In particular embodiments, server 120 is connected with each of clients 130 via separate connections 150. In particular embodiments, connections 150 between server 120 and clients 130 may be network connections via a computer network, such as, for example and without limitation, the Internet, an Intranet, a Local Area Network (LAN), a Wide Area Network (WAN), a wireless network, or a combination of two or more such computer networks. In particular embodiments, each of network connections 150 may be a Transport Control Protocol (TCP) connection, a User Datagram Protocol (UDP) connection, or any other suitable connection. In particular embodiments, server 120 may have multiple TCP sockets 124, and each of clients 130 may be connected to a different TCP socket 124 via a separate TCP connection 150. For example, client 130A may be connected to TCP socket 124A of server 120 via TCP connection 150A.

In particular embodiments, data may be exchanged between server 120 and each of clients 130 bi-directionally via a corresponding connection 150. For example, server 120 and client 130A may exchange data bi-directionally via connection 150A. The data may be in any suitable format. For example, server 120 may transmit data to clients 130 in the form of video streams; and clients 130 may each transmit data to server 120. The communications between server 120 and clients 130 may use any suitable protocol. For example, suppose an instance of application 131A is executed on server 120 for client 130A. The rendered output of the instance of application 131A executed on server 120 may be transmitted from server 120 to client 130A in the form of a video stream, with each rendered image representing the output of the instance of application 131A as a particular frame of the video stream. Input received at client 130A, particularly those input that may cause the instance of application 131A executed on server 120 to change state, may be transmitted from client 130A to server 120.

In particular embodiments, server 120 may have one or more Central Processing Units (CPUs) 122 and one or more Graphics Processing Units (GPUs) 121. CPUs and GPUs are well known in the field of computer. Briefly, a CPU is the portion of a computer system that carries out the computer's functions and the instructions of computer programs. A GPU is a specialized processor that offloads graphics rendering from the microprocessor (e.g., the CPU). In general, GPUs are very efficient at manipulating computer graphics, and their highly parallel structure makes them more effective than general-purpose CPUs for a range of complex algorithms (e.g., graphics-related algorithms). In particular embodiments, GPU 121 may be a part of a video card or on the motherboard of server 120.

Figure 2:
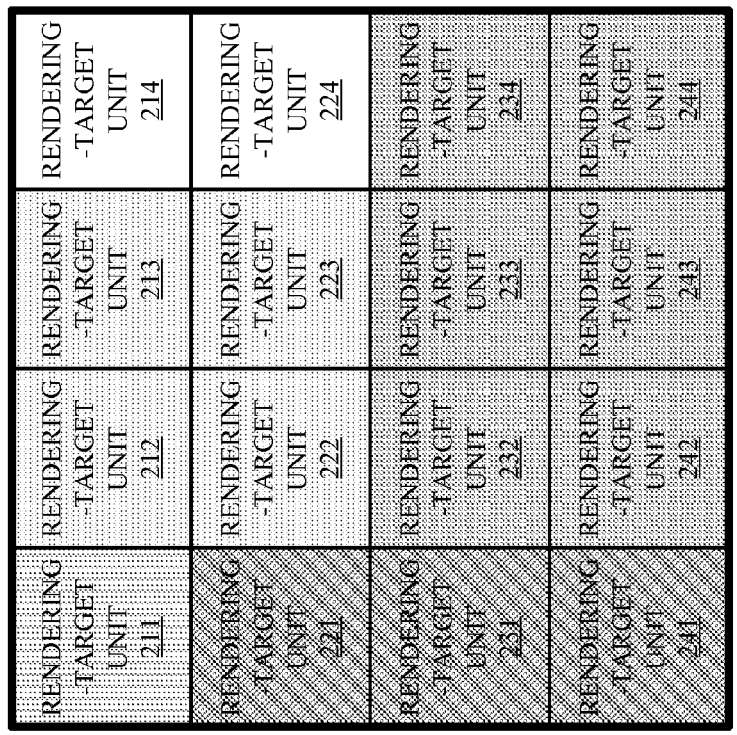
FIG. 2 illustrates an example rendering target of a server that is partitioned into multiple rendering-target units.

In particular embodiments, GPU 121 may include a rendering target. In particular embodiments, a rendering process renders the output of one or more applications as one or more images into the rendering target. In particular embodiments, the rendered 2D image may be stored in the rendering target of GPU 121. In particular embodiments, the rendering target may be a frame buffer or any suitable type of memory or storage within GPU 121. FIG. 2 illustrates an example rendering target 200 of a GPU (e.g., GPU 121). In this example, rendering target 200 is a memory storage, such as a frame buffer, within GPU 121. In particular embodiments, a rendering target may store up to 256 mega pixels that represent the rendered output of one or more applications. Accordingly, a rendering target can, for example, be divided into a 16×16 grid of 1 mega-pixel blocks (1024× 1024 pixels). The rendering target can also be divided to accommodate other display aspect ratios.

In particular embodiments, a rendering target may be partitioned into a number of portions. In FIG. 2, rendering target 200 is partitioned into sixteen portions in a four-by-four grid, and each portion may be referred to as a unit of rendering target 200, or a rendering-target unit. Again, rendering target 200 is partitioned into sixteen rendering-target units to simplify the discussion. In practice, a rendering target may be partitioned into any number of units and there is no theoretical limitation on how many rendering-target units into which a rendering target may be partitioned. Similarly, the size and dimension of each rendering-target unit may vary depending on the size and dimension of the rendering target and the number of rendering-target units into which the rendering target is partitioned. For example, each rendering-target unit may be 256 pixels-by-256 pixels, 512 pixels-by-512 pixels, or 1024 pixels-by-1024 pixels. Of course, it is not necessary that a rendering-target unit has the same width and height. For example, a rendering-target unit may be 256 pixels-by-512 pixels or 512 pixels-by-256 pixels.

In particular embodiments, rendering target 200 of GPU 121 of server 120 may be allocated among the four clients 130, such that each of clients 130 is allocated one or more rendering-target units. How many rendering-target units are allocated to a particular client 130 may depend on the actual requirements and system architecture of that client 130. In particular embodiments, the resolution, dimension, and orientation of the display of a particular client 130 may determine how many rendering-target units are allocated to that client 130.

For example, suppose each rendering-target unit in FIG. 2 is 1024 pixels-by-1024 pixels. Further suppose client 130A is a notebook computer with a relatively low-resolution display (e.g., 1024 pixels-by-768 pixels). In this case, a single rendering-target unit may have sufficient memory space to store rendered images of 1024 pixels-by-768 pixels or smaller. Thus, client 130A may be allocated one rendering-target unit (e.g., rendering-target unit 211). On the other hand, suppose client 130B is a desktop computer having a display of 1920 pixels-by-1680 pixels. In this case, four rendering-target units may be needed to store images of 1920 pixels-by-1680 pixels or smaller. Thus, client 130B may allocated four rendering-target units (e.g., rendering-tart units 212, 213, 222, and 223).

In particular embodiments, the orientation of the rendering-target units allocated to a particular client 130 may depend on the dimension and the orientation of the display of that client 130. For example, suppose client 130C has an elongated display, where the width of the display is much smaller than the height of the display. In this case, three rendering-target units 221, 231, 241 within the same column may be allocated to client 130C in order to support its elongated display (i.e., rendering-target units 221, 231, 241 together simulate the dimension and orientation of the display of client 130C). Finally, suppose client 130D has a high-resolution display so that six rendering-target units 232, 233, 234, 242, 243, 244 are allocated to client 130D in order to store rendered images of such high resolutions.

Of course, it is not necessary that all available rendering-target units are allocated to individual clients at any given time. Sometimes, a number of rendering-target units (e.g., rendering-target units 214, 224) may be unallocated during certain renderings and may be allocated to clients 130 at a later time. Similarly, rendering-target units already allocated to a particular client 130 may be freed up when they are no longer need (e.g., when that particular client 130 has disconnected from server 120).

In particular embodiments, each of clients 130 may be associated with one or more computer programs, also referred to as applications. To simplify the discussion, in FIG. 1, a single application 131 is illustrated as being associated with each client 130. For example, application 131A is associated with client 130A. However, the same concept applies when multiple applications are associated with each client 130.

In particular embodiments, server 120 is configured to host one or more instances of one or more applications 131 for one or more of clients 130. The rendered output of the instances of applications 131 is transmitted to corresponding clients 130 to be displayed to one or more users of clients 130.

In particular embodiments, instances of applications 131 associated with clients 130 may be executed on server 120 for clients 130. The output of the instances of applications 131 executed on server 120 may be rendered as images by server 120. In particular embodiments, the rendered output of the instances of applications 131 may be encoded as video data and transmitted to corresponding clients 130 as video streams. Each of clients 130, upon receiving the video stream that represents the rendered output of its corresponding application 131, may decode the video data and display the rendered output of corresponding application 131. For example, an instance of application 131A is executed on server 120 for client 130A. The output of the instance of application 131A may be rendered as one or more images by server 120. The rendered output of the instance of application 131A may be encoded in a video stream and transmitted client 130A. Client 130A, upon receiving the video stream, may decode the video stream to retrieve the rendered output of application 131A and display the output on client 130A. In particular embodiments, each of clients 130 may include one or more CPUs (not shown) and one or more GPUs (not shown). In particular embodiments, each of clients 130 may load the video stream (i.e., the encoded video frames) into its GPUs' memory and decode the encoded video data in order to display the rendered output of corresponding application 131.

As instances of computer programs 131 execute on clients 130, various renderings may need to be performed. For example, suppose program instance 131A is a game application. The video of the game may progress at a rate of 60 frames-per-second, and each frame may require a new rendering of the 3D model of the game scene into an image. Thus, program instance 131A may require 60 renderings-per-second. Suppose program instance 131B is an animated movie, and the video may progress at a rate of 30 frames-per-second. Again, each frame may require a new rendering the animation scene into an image. Thus, program instance 131B may require 30 renderings-per-second. Furthermore, for each program instance 131, there may be a set of rendering parameters that indicates how an image is to be rendered from the 3D model of that program instance 131. In particular embodiments, the rendering parameters may include, for example and without limitation, the model to be rendered, view port or camera angle, lighting, texture, shading, or image resolution. Furthermore, the rendering parameters may change from frame to frame, and thus from rendering to rendering. For example, with a game application such as program instance 131A, as the player at client 130A moves through the game scene, the objects as well as the camera angle, lighting, and shading in the 3D model of the game scene may vary. Consequently, each rendering may have a different set of rendering parameters corresponding to the current state of the game, indicating, for example, a particular scene, view position, camera angle, lighting, or shading, for that rendering.

In particular embodiments, server 120 may maintain a different set of rendering parameters 123 for each of clients 130 currently connected to server 120. For example, rendering parameter set 123A corresponds to client 130A. Each set of rendering parameters 123 may be obtained from the corresponding instance of computer program 131, and describe how renderings are to be performed for that instance of computer program 131. For example, rendering parameter set 123A may include rendering parameters that describe how renderings are to be performed for program instance 131A and may be updated based on the current state of program instance 131A.

Sometimes, multiple clients 130 may execute multiple instances of the same computer program and yet have different rendering parameters 123. For example, suppose clients 130A and 130D execute two instances of the same game application. The two players at clients 130A and 130D may play the same game independently or interactively (e.g., as two different characters in the same game). If the two players play the same game independently, at a particular time, they may be at different stages of the game, and thus, the images they see on the displays of clients 130A and 130D are different. If the two players play the same game interactively, at a particular time, even if the two players are both in the same game scene, they may view the game scene from different positions and different angles. Again, the two players may see different images on the displays of clients 130A and 130D. In either cases, because the two players see different images at any given time, the rendering parameters differ between the two instances of the same game application.

In a given rendering pass, a pixel shader (and/or other rendering functions) operate with a set of rendering parameters that define, among other things, the view point from which to render an image, and the like. In particular embodiments, during a single rendering pass, server 120 may concurrently perform four renderings for the four program instances 131 executing on clients 130 respectively based on the four sets of rendering parameters 123. In particular embodiments, GPU 121 may perform the actual rendering functionalities. In particular embodiments, each rendering outputs a rendered image frame for each of the clients concurrently. In particular embodiments, each of the four rendered images is stored in the particular portion of rendering target 200 within GPU 121 that has been allocated for the corresponding client 130. For example, the first rendering is performed for program instance 131A executing on client 130A based on rendering parameter set 123A, and the first rendered image is stored in rendering-target unit 211. The second rendering is performed for program instance 131B executing on client 130B based on rendering parameter set 123B, and the second rendered image is stored in rendering-target units 212, 213, 222, 223. The third rendering is performed for program instance 131C executing on client 130C based on rendering parameter set 123C, and the third rendered image is stored in rendering-target units 221, 231, 241. The fourth rendering is performed for program instance 131D executing on client 130D based on rendering parameter set 123D, and the fourth rendered image is stored in rendering-target units 232, 233, 234, 241, 242, 243, 244.

In particular embodiments, during a single encoding pass, server 120 may concurrently encode the four rendered images stored in rendering target 200. In particular embodiments, GPU 121 may perform the actual encoding functionalities. For example, each of the rendered images may be encoded as a single frame of a different video stream. In particular embodiments, server 120 may then transmit the four rendered images, now encoded in four video streams, to the four clients 130 respectively. More specifically, the first rendered image may be encoded as a frame of a first video stream and transmitted to client 130A. The second rendered image may be encoded as a frame of a second video stream and transmitted to client 130B. The third rendered image may be encoded as a frame of a third video stream and transmitted to client 130C. The fourth rendered image may be encoded as a frame of a fourth video stream and transmitted to client 130D. Each of clients 130, upon receiving the corresponding video stream, may decode the video stream and display the rendered image on its display.

In particular embodiments, server 120 may implement video codec functionalities. The video codec may be used to encode the rendered images that represent the output of the instances of applications 131 executed on server 120. In particular embodiments, the video codec accesses the rendered images stored in rendering target 200 and divides the images into macroblocks. In one implementation, the size of each macroblock is 16 pixels-by-16 pixels. As described below, Discrete Cosine Transform (DCT) operations may be performed, in some implementations, on 8×8 partitions. Accordingly, each macroblock, due to 4:2:0 down-sampling, includes four 8×8 luma partitions, four 4×4 Cb partitions, and four 4×4 Cr partitions. However, other macroblock sizes can be used. The video codec then performs certain transform and quantization operations on the luma and chroma partitions of each macroblock as follows. These operations can be done serially or in parallel. If the encoding operations are performed on a GPU, the processing for the macroblocks can be accomplished in parallel resulting in reduced processing time and greater through-put.

The codec fits a 2D plane to each macroblock that best models the luma values of the pixels of the macroblock. The plane is defined by the equation $z=ax+by$, where a and b define the gradient parameters of the plane. The codec then adjusts the luma values for the pixels of the macroblock based on the plane gradient parameters. In one implementation, the codec, for each pixel, subtracts the corresponding value of the plane equation from the pixel value at that location. Conceptually, this is defined by the following equation: adjusted pixel(x,y)=pixel(x,y)−z. The codec, in one implementation, does not adjust the values of the chroma partitions.

The codec then applies a DCT to the macroblock. In one implementation, the codec applies the DCT separately to the four luma partitions of 8×8 pixels and the eight 4×4 chroma partitions. The codec then applies a 2×2 Hadamard transform on the DC components of each DCT coefficient set corresponding to each luma partition, and to each chroma partition, to find correlation between the DC coefficient values. In an alternative implementation, the codec dynamically determines the size of the partitions. For example, the codec may dynamically choose between 4×4, 8×8 or 16×16 partitions based on rate and distortion for each partition choice.

The codec reorders the DCT coefficients for a macroblock into a one-dimensional (1D) array. In one implementation, DCT coefficients of the four luma partitions are scanned in a zigzag order and then the DCT coefficients are interlaced to group the DC component values and other corresponding DCT component values together. In one implementation, the luma partitions are separately encoded from the chroma partitions. In one implementation, the chroma partitions are interlaced together in a manner similar to the luma channel. In other implementations, alternatives to zigzag re-ordering can be used.

The codec also quantizes the DCT coefficients in the 1D array using, for example, rate distortion optimization, which is a quantization process that evaluates whether to round up or down to the nearest integer, or to round to zero, based on the resulting cost (the number of bits required to encode) for each choice and the error or distortion associated with each choice. Rate-distortion optimization, in one implementation, essentially applies a video quality metric, measuring both the deviation from the source and the bit cost for each possible decision outcome. The bits are mathematically measured by multiplying the bit cost by the Lagrangian, a value representing the relationship between bit cost and quality for a particular quality level. The deviation from the source can be measured as the mean squared error, in order to maximize the Peak signal-to-noise ratio (PSNR) video quality metric. Calculating the bit cost can be accomplished by passing each block of video to be tested to the entropy coder to measure its actual bit cost.

The codec then computes the DC prediction values for each macroblock and adjusts the DC coefficient for each macroblock based on the DC prediction value, in one implementation, by subtracting the DC prediction value from the DC coefficient for the macroblock. In one implementation, the DC prediction value, X, is based on the DC coefficients of neighboring blocks. In other words, the DC prediction value for block X is based on the sum of the DC coefficients for blocks a and b, less the DC coefficient value of block c. In one implementation, the DC prediction value adjustments are performed on both the luma and chroma channels.

The codec then encodes the quantized coefficients into a reserved memory space for each block. In one implementation, the codec uses a form of variable length coding to compress the quantized coefficients for each block. In one implementation, the codec uses run-length encoding (RLE) followed by Huffman coding. After encoding the quantized DCT coefficients for each macroblock, the result is the encoded bits for the macroblock and a bit-length. With knowledge of the bit length, the codec can perform a parallel prefix sum to obtain the starting position of each macroblock in the final output bit stream.

The codec then causes GPU 121 to writes the encoded data onto an output stream to be buffered in main system memory, in one implementation, by writing the data of each macroblock in a raster-like order. In one implementation, the data can be written into CPU memory by GPU 121 using parallel processing operations. For example, the codec may cause the data to be written to one or more output streams in a gather operation. For example, a process or function tasked with writing a data word (such as 1 or 2 bytes) can use the starting bit positions for each macroblock and the position of the data word in the output stream for the frame to determine from which reserved memory locations to access the data bit to construct the data word and write it to memory. The gather operation allows for writing the output in a parallel processing operation utilizing the resources of GPU 121 thereby further increasing throughput. For example, in one implementation, a function can be defined that receives as inputs the position of the data or machine word in the memory to which the output stream is written. The function is operative to assemble the machine word from selected portions of the bits of one or more macroblocks based on the position of the data or machine word and the starting bit values of the macroblocks, and write the data of machine word to the memory. This function can be implemented in parallel to accelerate writing this output from memory (e.g., rendering target 200) of GPU 121 to main memory for transmission over a network to clients 130. In other implementations, the memory of the GPU 121 can be directly accessed to write the data for transmission to a socket or other connection abstraction.

Some types of applications may need continuous rendering of their output into representative images. For example, as described above, game applications often require 60 renderings-per-second. Other types of applications may need a new rendering only in response to a user input. For example, a word processing application may only need to refresh a document displayed on the client's screen (i.e., render an image of the document) when the user makes an input. Furthermore, each rendering for an application instance executing on a client may be based on different rendering parameters as the current state of the application instance may change with time. In particular embodiments, each client 130 may transmit to server 120 the 3D model or other data on which the renderings are based of the program instance 131 executing on that client 130 and the most-current rendering parameters when needed. Server 120 may store the information received from each client 130. In particular embodiments, server 120 may, based on the information received from each client 130, determine when a rendering needs to be performed for a particular client, which 3D model and rendering parameters are to be used for that rendering, and other appropriate information. In particular embodiments, CPU 122 may perform the actual determinations. In particular embodiments, for each rendering pass, CPU 122 may provide GPU 121 with all the necessary data (e.g., models, sets of rendering parameters) that GPU 121 may need to perform the multiple renderings concurrently during that rendering pass.

Figure 3:
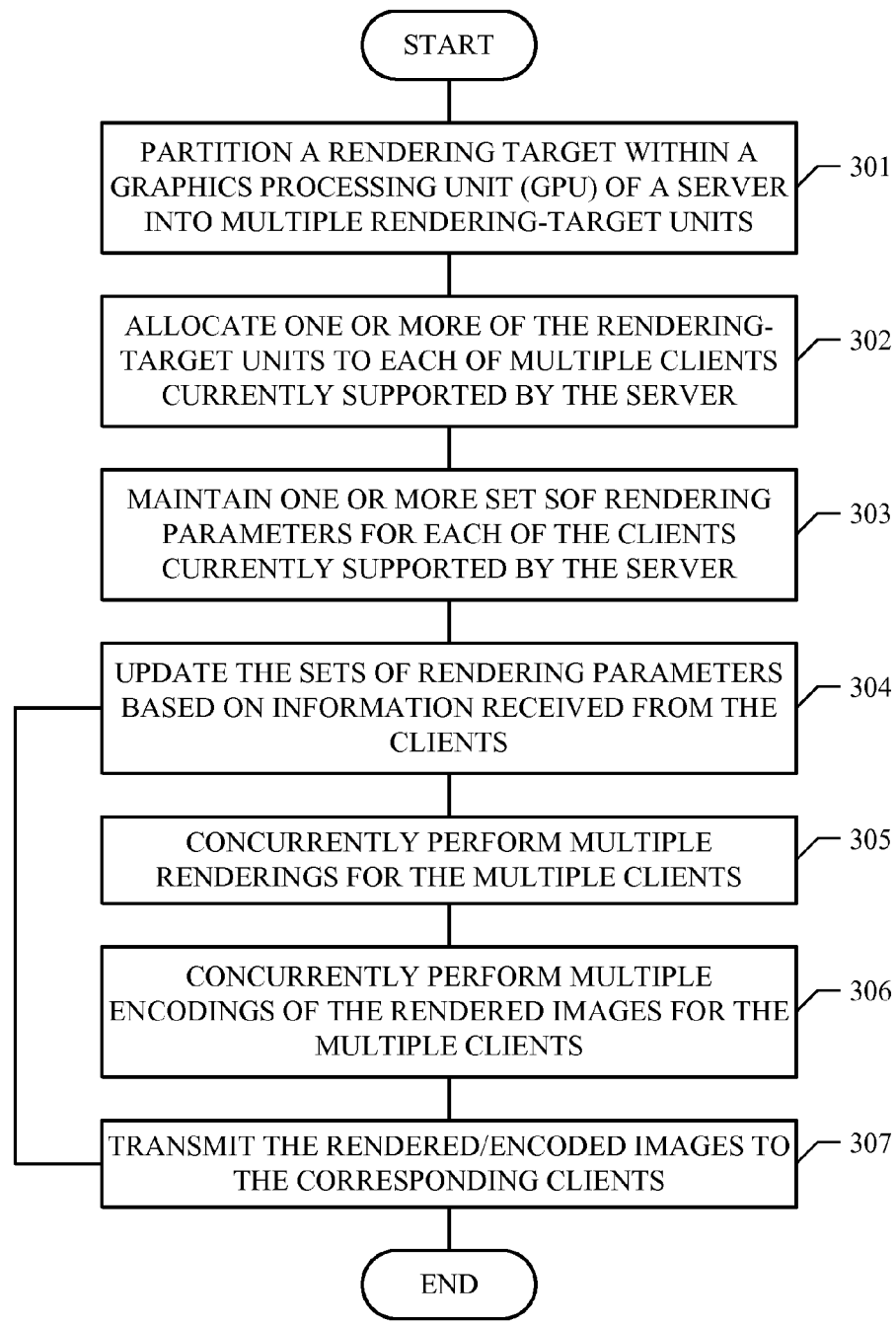
FIG. 3 illustrates a method of a server concurrently performing multiple renderings for multiple clients.

FIG. 3 illustrates a method of a server concurrently performing multiple renderings for multiple clients. Particular embodiments may partition a rendering target within a GPU of a server into multiple rendering-target units (step 301). In particular embodiments, the rendering target may be a frame buffer or any other suitable type of memory or storage within the GPU in which rendered images may be stored. In particular embodiments, the rendering-target units may be all of the same size (e.g., each rendering-target unit having the same number of pixels).

At any given time, the server may be connected to any number of clients and may perform renderings on behalf of and for these clients, and more specifically, for instances of computer programs executing on these clients. Particular embodiments may allocate one or more rendering-target units to each of the clients currently connected to and supported by the server (step 302). How many rendering-target units and which specific rendering-target units are actually allocated to a particular client may depend on the availability of the specific rendering-target units and the system architecture of that client, such as, for example and without limitation, the resolution, dimension, and orientation of the video frame buffer or the display of the client. For example, when a client is newly connected to the server, the server may allocate one or more of its currently available rendering-target units (i.e., the rendering-target units that are not currently allocated to any other clients) to that particular client. Conversely, when a client is disconnected from the server, the server may de-allocate (i.e., free up) the rendering-target units that have been allocated to that particular client so that these rendering-target units may be available to be allocated to other clients in the future. The number of rendering-target units allocated to a client may depend on the size or the resolution of the video frame buffer or the display of that particular client (e.g., a client having a high-resolution display may be allocated more number of rendering-target units than a client having a low-resolution display).

In particular embodiments, when an instance of a computer program begins executing on a client connected to the server, if the server is to perform renderings for this program instance, the client may notify the server of the program instance and request that the server perform renderings for this program instance. The client may transmit the model of the program instance to the server to be used during the renderings. The server may store the model of the program instance for the duration that it performs renderings for the program instance. In particular embodiments, since a server may perform renderings for multiple clients, each model may be identified with a unique identifier (ID) indicating with which client the model is associated, Of course, multiple instances of the same or different computer programs may be executed on a client. In particular embodiments, a client may request the server to perform renderings for multiple program instances executed on the client. In this case, the client may transmit to the server multiple models corresponding to the multiple program instances. For example, each time a program instance begins executing on the client, the client may transmit the model of that program instance to the server. The server may store these models, and each model may be identified with a unique ID indicating with which client and which program instance executing on that client the model is associated.

Particular embodiments may maintain one more sets of rendering parameters for each of the clients currently connected to and supported by the server (step 303). In particular embodiments, each set of rendering parameters corresponds to an instance of a computer program executing on a particular client and indicates how rendering is to be performed for that particular program instance. Thus, the rendering parameters may change with time (e.g., from rendering to rendering) as the display of the program instance may vary with time. In particular embodiments, each set of rendering parameters may be identified with a unique ID indicating with which client and which program instance executing on that client the model is associated.

There are many rendering techniques, and the present disclosure contemplates any suitable rendering techniques. For example, ray tracing is a well known and commonly used rendering technique that is capable of producing a very high degree of photorealism in the resulting rendered images. Briefly, ray tracing is a technique for generating an image from a model by tracing the path of light through pixels in an image plane. There are various algorithms that may be used with ray tracing. While ray tracking realistically simulates the effect of lighting on 3D objects, it is computational intensive and thus may be better implemented on a server. Particular embodiments may implement ray tracing algorithms on the server and perform the renderings using ray tracing.

In the field of computer graphics, a shader is a set of software instructions used primarily to calculate rendering effects on graphics hardware with a high degree of flexibility. In particular embodiments, shaders may be used to program the server's GPU programmable rendering pipeline, which may have mostly superseded the fixed-function pipeline. There are various types of shaders, and the present disclosure contemplates any suitable shaders. For example, vertex shaders may be run once for each vertext given to the GPU to transform each vertex's 3D position in virtual space to the 2D coordinate at which it appears on the display screen or in the rendered 2D image and a depth value for the Z-buffer. Vertex shaders may manipulate properties such as position, color, and texture coordinate. Geometry shaders, which may be the next stage in the rendering pipeline after vertext shaders, may add and remove vertices from a mesh and may be used to generate geometry procedurally or to add volumetric details to existing meshes. Pixel shaders, also referred to as fragment shaders, calculate the color of individual pixels and are typically used for scene lighting and related effects, such as bump mapping and color toning. In particular embodiments, each set of rendering parameters may include shader constants corresponding to the various types of shaders in the GPU's rendering pipeline. These shader constants indicate to the GPU how a particular rendering is to be performed. Thus, in effect, the shader constants may be used to control the results of the renderings (i.e., the rendered images).

As indicated above, each set of rendering parameters (e.g., shader constants) may vary from rendering to rendering for the corresponding program instance because the program instance may display different images at different times. Particular embodiments may update the sets of rendering parameters maintained by the server prior to a rendering pass if necessary (step 304). Each client may transmit to the server the current states of the program instances executing on that client and supported by the server. In particular embodiments, the server may update the sets of rendering parameters based on the information received from the clients.

In particular embodiments, the server may concurrently render multiple images for the multiple clients currently supported by the server (i.e., perform multiple renderings) during a single rendering pass (step 305). In particular embodiments, a single rendering pass may move once through the GPU rendering pipeline. There may be various stages within a rendering pipeline. For example, first, the CPU of the server may send instructions and geometry data to the GPU of the server. These instructions and data may be determined based on the corresponding models and sets of rendering parameters. Second, within the vertex shader, the geometry may be transformed and lighting calculations may be performed. Third, if geometry shader is used, then some changes of the geometries in the scene may be performed. Fourth, the calculated geometry may be triangulated. And finally, the triangles may be transformed into pixels.

To concurrently render multiple images during a single rendering pass, the GPU may share its resources among the multiple rendering processes. In particular embodiments, each of the resulting rendered images, and more specifically, the pixel values of the rendered image, is stored in the specific rendering-target units allocated to the client corresponding to the rendered image.

In particular embodiments, the server may transmit the rendered images to each of the clients it currently supports using a video stream, such that each of the rendered images is a frame of the video stream. In particular embodiments, the server may, in a single encoding pass, concurrently encoded the multiple rendered images stored in the rendering target into multiple video streams corresponding to the multiple clients (step 306). For example, a first rendered image is encoded as the current frame of a first video stream for a first client; a second rendered image is encoded as the current frame of a second video stream for a second client; and so on.

In particular embodiments, the server may then transmit the rendered images, now encoded as frames in the video streams, to the clients (step 307). Each video stream is transmitted to the corresponding client. For example, the first video stream is transmitted to the first client; the second video stream is transmitted to the second client; and so on. Each client, upon receiving the new data in the video stream, may decode the video stream to extract the current frame, which is in fact the image rendered by the server. The client may then display the current frame (i.e., the rendered image) on its display screen.

Often, multiple renderings may need to be performed for each program instance executing on each client. Thus, steps 304-307 may be repeated. Each rendering pass may result a number of rendered images for the clients currently supported by the server, with one rendered image for one particular client. Each rendered image may be encoded as a separate frame in the corresponding video stream and transmitted to the corresponding client.

Figure 4:
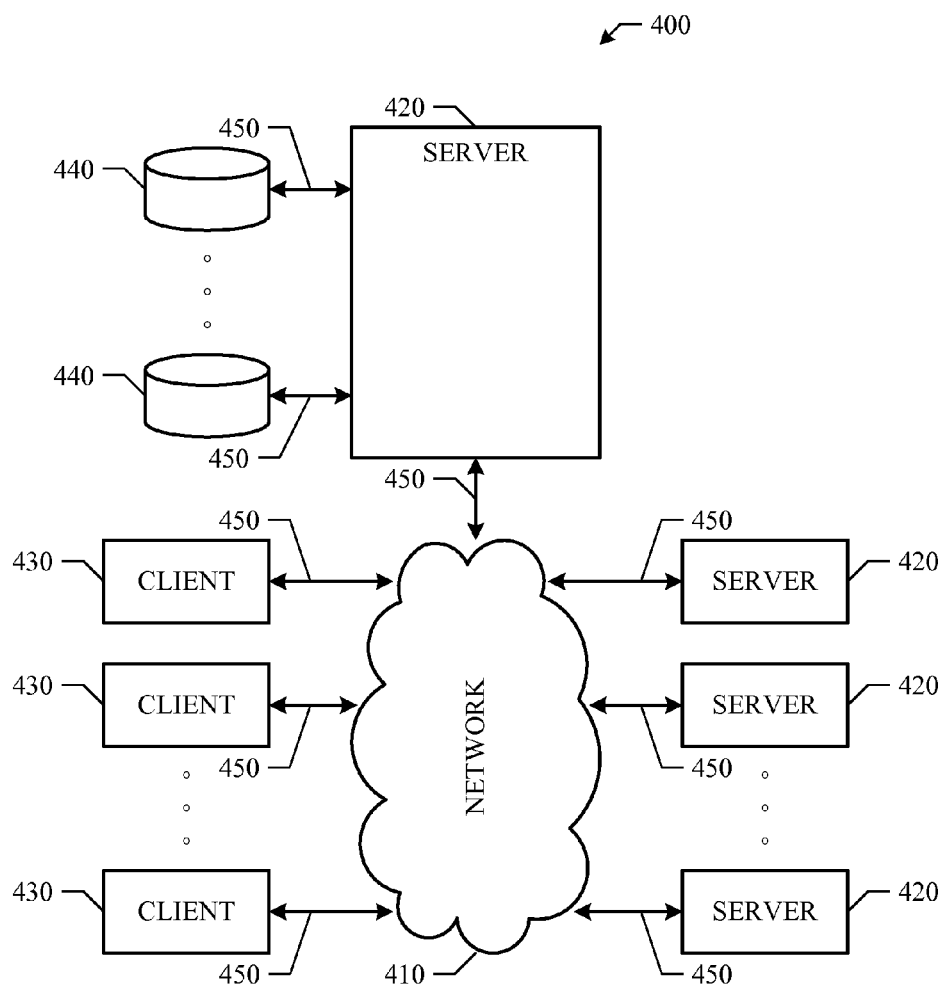
FIG. 4 illustrates an example network environment.

Particular embodiments may be implemented in a network environment. FIG. 4 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 410 or a combination of two or more such networks 410. The present disclosure contemplates any suitable network 410.

One or more links 450 couple servers 420 or clients 430 to network 410. In particular embodiments, one or more links 450 each includes one or more wired, wireless, or optical links 450. In particular embodiments, one or more links 450 each includes an intranet, an extranet, a VPN, a LAN, a WLAN, a WAN, a MAN, a communications network, a satellite network, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. A client 430 may enable an network user at client 430 to access network 410. A client 430 may have a web browser, such as Microsoft Internet Explorer or Mozilla Firefox, and may have one or more add-ons, plug-ins, or other extensions, such as Google Toolbar or Yahoo Toolbar. A client 430 may enable its user to communicate with other users at other clients 430. The present disclosure contemplates any suitable clients 430.

In particular embodiments, one or more data storages 440 may be communicatively linked to one or more servers 420 via one or more links 450. In particular embodiments, data storages 440 may be used to store various types of information. In particular embodiments, the information stored in data storages 440 may be organized according to specific data structures. Particular embodiments may provide interfaces that enable servers 420 or clients 430 to manage (e.g., retrieve, modify, add, or delete) the information stored in data storage 440.

In particular embodiments, each server 420 may concurrently service one or more clients 430 and perform renderings for the clients 430 it supports. A server 420 may transmit the images rendered for a particular client 430 it supports by encoding the rendered images in a video stream, with each rendered image as a particular frame, and transmits the video stream to the client 430. A client 430, upon receiving the video stream, may decode the video stream to exact the image frames for display. U.S. application Ser. Nos. 12/579,300 and 12/709,343, both of which are incorporated by reference herein for all purposes, discloses video codecs that may be used to deliver a compressed video stream to one or more clients 430. In addition, the foregoing applications also disclose how each server 420 may utilize the parallel processing resources of the GPUs to generate and stream the video data to the clients 430.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 5:
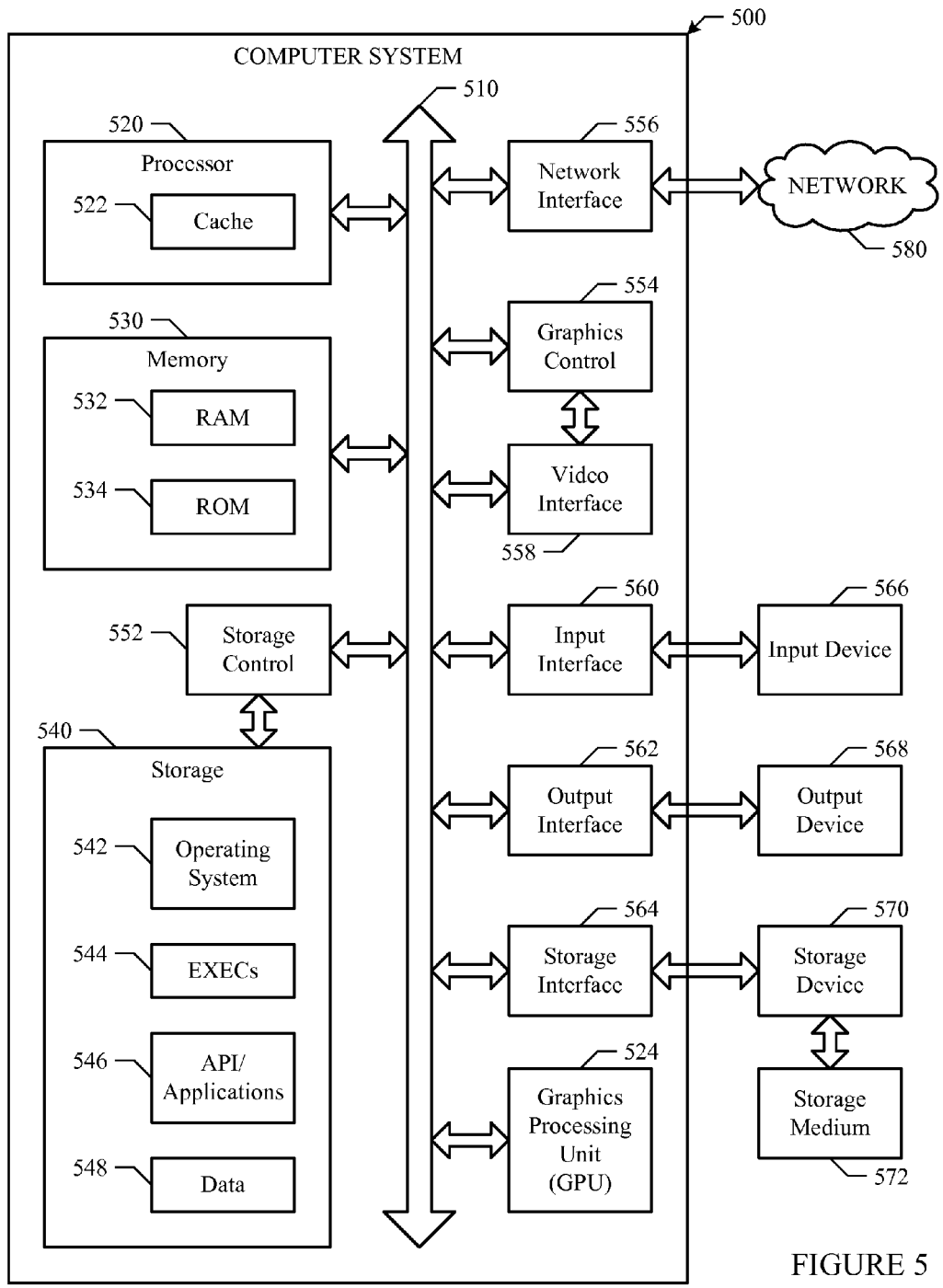
FIG. 5 illustrates an example computer system.

For example, FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 520 (or central processing units (CPUs)). A processor 520 may contain a cache 522 for temporary local storage of instructions, data, or computer addresses. Processors 520 are coupled to one or more storage devices, including memory 530. Memory 530 may include random access memory (RAM) 532 and read-only memory (ROM) 534. Data and instructions may transfer bi-directionally between processors 520 and RAM 532. Data and instructions may transfer uni-directionally to processors 520 from ROM 534. RAM 532 and ROM 534 may include any suitable computer-readable storage media.

Computer system 500 includes fixed storage 540 coupled bi-directionally to processors 520. Fixed storage 540 may be coupled to processors 520 via storage control unit 552. Fixed storage 540 may provide additional data storage capacity and may include any suitable computer-readable storage media. Fixed storage 540 may store an operating system (OS) 542, one or more executables 544, one or more applications or programs 546, data 548, and the like. Fixed storage 540 is typically a secondary storage medium (such as a hard disk) that is slower than primary storage. In appropriate cases, the information stored by fixed storage 540 may be incorporated as virtual memory into memory 530.

Processors 520 may be coupled to a variety of interfaces, such as, for example, graphics control 554, video interface 558, input interface 560, output interface 562, and storage interface 564, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 556 may couple processors 520 to another computer system or to network 580. With network interface 556, processors 520 may receive or send information from or to network 580 in the course of performing steps of particular embodiments. Particular embodiments may execute solely on processors 520. Particular embodiments may execute on processors 520 and on one or more remote processors operating together.

In a network environment, where computer system 500 is connected to network 580, computer system 500 may communicate with other devices connected to network 580. Computer system 500 may communicate with network 580 via network interface 556. For example, computer system 500 may receive information (such as a request or a response from another device) from network 580 in the form of one or more incoming packets at network interface 556 and memory 530 may store the incoming packets for subsequent processing. Computer system 500 may send information (such as a request or a response to another device) to network 580 in the form of one or more outgoing packets from network interface 556, which memory 530 may store prior to being sent. Processors 520 may access an incoming or outgoing packet in memory 530 to process it, according to particular needs.

Computer system 500 may have one or more input devices 566 (which may include a keypad, keyboard, mouse, stylus, etc.), one or more output devices 568 (which may include one or more displays, one or more speakers, one or more printers, etc.), one or more storage devices 570, and one or more storage medium 572. An input device 566 may be external or internal to computer system 500. An output device 568 may be external or internal to computer system 500. A storage device 570 may be external or internal to computer system 500. A storage medium 572 may be external or internal to computer system 500.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 530 may include one or more computer-readable storage media embodying software and computer system 500 may provide particular functionality described or illustrated herein as a result of processors 520 executing the software. Memory 530 may store and processors 520 may execute the software. Memory 530 may read the software from the computer-readable storage media in mass storage device 530 embodying the software or from one or more other sources via network interface 556. When executing the software, processors 520 may perform one or more steps of one or more processes described or illustrated herein, which may include defining one or more data structures for storage in memory 530 and modifying one or more of the data structures as directed by one or more portions the software, according to particular needs. In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

In particular embodiments, computer system 500 may include one or more Graphics Processing Units (GPUs) 524. In particular embodiments, GPU 524 may comprise one or more integrated circuits and/or processing cores that are directed to mathematical operations commonly used in graphics rendering. In some embodiments, the GPU 524 may use a special graphics unit instruction set, while in other implementations, the GPU may use a CPU-like (e.g. a modified x86) instruction set. Graphics processing unit 524 may implement a number of graphics primitive operations, such as blitting, texture mapping, pixel shading, frame buffering, and the like. In particular embodiments, GPU 524 may be a graphics accelerator, a General Purpose GPU (GPGPU), or any other suitable processing unit.

In particular embodiments, GPU 524 may be embodied in a graphics or display card that attaches to the hardware system architecture via a card slot. In other implementations, GPU 524 may be integrated on the motherboard of computer system architecture. Suitable graphics processing units may include Advanced Micro Devices(r)AMD R7XX based GPU devices (Radeon(r) HD 4XXX), AMD R8XX based GPU devices (Radeon(r) HD 5XXX, Intel(r) Larabee based GPU devices (yet to be released), nVidia(r) 8 series GPUs, nVidia(r) 9 series GPUs, nVidia(r) 100 series GPUs, nVidia (r) 200 series GPUs, and any other DX11-capable GPUs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    hosting, on a computer system, a plurality of application instances, each application instance corresponding to a remote client application of a plurality of remote client applications;
    allocating, by the computer system, resources of a graphics processing unit (GPU) of the computer system between at least two of the plurality of remote client applications;
    concurrently rendering, by the computer system, utilizing the resources of the GPU of the computer system during a single rendering pass that moves once through a GPU rendering pipeline, graphical output of the application instances corresponding to the at least two of the remote client applications; and
    transmitting, by the computer system, the rendered graphical output to the at least two of the remote client applications.

2. The method recited in claim 1, wherein:
    the resources of the GPU comprise a memory storage, and
    allocating the resources of the GPU between at least two of the remote client applications comprises allocating a particular portion of the memory storage to each of the at least two of the remote client applications.

3. The method recited in claim 2, wherein each rendered graphical output is stored in the portion of the memory storage allocated to the corresponding remote client application.

4. The method recited in claim 1, further comprising concurrently encoding, by the computer system, utilizing the resources of the GPU of the computer system, the rendered graphical output prior to transmission.

5. The method recited in claim 4, wherein each of the rendered graphical output is encoded and transmitted to the corresponding remote client application in a video stream.

6. The method recited in claim 4, wherein the rendered graphical output of the application instances is encoded in a single encoding pass.

7. The method recited in claim 1, wherein concurrently rendering graphical output of the application instances corresponding to the at least two of the remote client applications is based on a model and a set of rendering parameters obtained from a corresponding application instance hosted for each of the at least two of the remote client applications, the model being represented in a defined language or data structure and the set of rendering parameters indicating how the graphical output is to be generated from the model.

8. The method recited in claim 7, further comprising updating, by the computer system, the plurality sets of rendering parameters.

9. The method recited in claim 7, wherein each one of the plurality sets of rendering parameters comprises at least one shader constant.

10. The method recited in claim 1, wherein the GPU of the computer system comprises a rendering target for storing a plurality of images.

11. The method recited in claim 10, wherein the rendering target may be partitioned into a plurality of rendering-target units.

12. The method recited in claim 11, wherein:
each one of the plurality of rendering-target units is for storing at least one pixel; and
each one of the plurality of images is rendered into the at least one of the plurality of rendering-target units.

13. The method recited in claim 11, wherein allocating resources of the GPU of the computer system between at least two of the plurality of remote client applications is by allocating the rendering target such that each of the at least two of the plurality of remote client applications is allocated one or more rendering-target units.

14. The method recited in claim 10, wherein:
each one of the plurality of images is encoded as a current frame of a particular one of a plurality of video streams; and
each one of the plurality of video streams corresponds to a particular one of the at least two of the plurality of remote client applications.

15. The method recited in claim 14, wherein transmitting the rendered graphical output to the at least two of the remote client applications comprises transmitting, by the computer system, each one of the plurality of video streams to the corresponding one of the at least two of the plurality of remote client applications.

16. A system comprising:
a memory comprising instructions executable by one or more processors;
a graphics processing unit; and
one or more processors coupled to the memory and operable to execute the instructions, the one or more processors being operable when executing the instructions to:
host a plurality of application instances, each application instance corresponding to a remote client application of a plurality of remote client applications;
allocate resources of a graphics processing unit (GPU) of the computer system between at least two of the plurality of remote client applications;
concurrently render, utilizing the resources of the GPU of the computer system during a single rendering pass that moves once through a GPU rendering pipeline, graphical output of the application instances corresponding to the at least two of the remote client applications; and
transmit the rendered graphical output to the at least two of the remote client applications.

17. The system recited in claim 16, wherein the one or more processors being operable when executing the instructions to:
concurrently encode utilizing the resources of the GPU of the computer system, the rendered graphical output prior to transmission.

18. The system recited in claim 17, wherein each of the rendered graphical output is encoded and transmitted to the corresponding remote client application in a video stream.

19. The system recited in claim 17, wherein the rendered graphical output of the application instances is encoded in a single encoding pass.

20. The system recited in claim 16, wherein the GPU of the computer system comprises a rendering target for storing a plurality of images.

21. A non-transitory computer-readable storage medium tangibly encoded with computer-executable instructions, that when executed by a processor associated with a computing device, performs a method comprising:
hosting a plurality of application instances, each application instance corresponding to a remote client application of a plurality of remote client applications;
allocating resources of a graphics processing unit (GPU) of the computer system between at least two of the plurality of remote client applications;
concurrently rendering, utilizing the resources of the GPU of the computer system during a single rendering pass that moves once through a GPU rendering pipeline, graphical output of the application instances corresponding to the at least two of the remote client applications; and
transmitting the rendered graphical output to the at least two of the remote client applications.

* * * * *